(12) United States Patent
Lehmann et al.

(10) Patent No.: US 8,139,315 B2
(45) Date of Patent: Mar. 20, 2012

(54) STORAGE SLOT FOR DATA STORAGE CARTRIDGES OF DIFFERING DIMENSIONS

(75) Inventors: Stefan Lehmann, Tucson, AZ (US); Jonathan Scott Newcom, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 858 days.

(21) Appl. No.: 12/163,086

(22) Filed: Jun. 27, 2008

(65) Prior Publication Data

US 2009/0323217 A1    Dec. 31, 2009

(51) Int. Cl.
*G11B 5/008*   (2006.01)
*G11B 23/037*  (2006.01)
*G11B 33/02*   (2006.01)

(52) U.S. Cl. .......................................... 360/94
(58) Field of Classification Search ............ 360/94, 360/92.1, 96.51
See application file for complete search history.

(56) References Cited

U.S. PATENT DOCUMENTS

| | | | | |
|---|---|---|---|---|
| 5,566,368 A * | 10/1996 | Yamashita | .................. | 360/96.51 |
| 5,706,146 A * | 1/1998 | Ono et al. | ....................... | 360/94 |
| 5,793,565 A * | 8/1998 | Suzuki | ............................ | 360/94 |
| 6,028,733 A * | 2/2000 | Schmidtke et al. | .......... | 360/92.1 |
| 6,046,880 A * | 4/2000 | Markus | ...................... | 360/99.06 |
| 6,095,446 A * | 8/2000 | Buckland et al. | .............. | 242/336 |
| 6,526,017 B1 * | 2/2003 | Smith | ....................... | 369/178.01 |
| 7,019,940 B2 * | 3/2006 | Smith et al. | ................... | 360/92.1 |
| 2006/0231513 A1 | 10/2006 | Thorson et al. | ................. | 211/26 |
| 2007/0290433 A1 * | 12/2007 | Mushimoto et al. | .......... | 271/160 |

FOREIGN PATENT DOCUMENTS

| | | |
|---|---|---|
| JP | 56-140547 | 11/1981 |
| JP | 01-317265 | 12/1989 |
| JP | 09-282754 | 10/1997 |

* cited by examiner

*Primary Examiner* — Jefferson Evans
(74) *Attorney, Agent, or Firm* — John H. Holcombe

(57) ABSTRACT

A storage slot for removably holding and aligning data storage cartridges of differing dimensions. Two bowed leaf springs are positioned within the storage slot, at two side walls and opposite from, respectively, two opposite side walls. The bowed leaf springs extend in a direction parallel to a direction of insertion and withdrawal of a data storage cartridge, and are fixed at the end closest to the opening. A bowed portion of each bowed leaf spring forms a ramp surface towards the opening and towards a corresponding opposite side wall. The bowed leaf springs are located a distance from the corresponding opposite side wall to form an interference fit with the smallest dimensioned data storage. The bowed leaf springs thus provide compression toward a data storage cartridge, to hold and align the data storage cartridge against the opposite side wall.

15 Claims, 8 Drawing Sheets

STORAGE SLOT FOR DATA STORAGE CARTRIDGES OF DIFFERING DIMENSIONS

DOCUMENT INCORPORATED BY REFERENCE

Commonly assigned U.S. Pat. No. 6,943,976 is incorporated for its showing of an automated data storage library which may be adapted in accordance with the present invention.

FIELD OF THE INVENTION

This invention relates to storage slots for supporting data storage cartridges, such as are employed in automated data storage libraries.

BACKGROUND OF THE INVENTION

Data storage cartridges provide means for storing large quantities of data, are not permanently mounted on data storage drives, and are stored in a readily available form in storage slots, for example, in automated data storage libraries. In an automated data storage library, one or more robot accessors insert and withdraw the data storage cartridges from the storage slots and transport them to and from data storage drives.

A data storage library typically comprises data storage drives adapted to operate only one type of data storage cartridge, and has storage slots sized to store that type of data storage cartridge. Further, data storage cartridges, although employing the same type of data storage media, for example, half inch magnetic tape, may be sized differently. In one example, the IBM® 3592 Jx-type tape cartridge is slightly larger than an IBM® LTO tape cartridge. The differences in size together with mechanical differences differentiates the two cartridges and prevents the IBM® 3592 Jx-type tape cartridge from being loaded into an IBM® LTO tape drive.

SUMMARY OF THE INVENTION

A storage slot for removably holding and aligning data storage cartridges of differing dimensions, in one embodiment, comprises at least two bowed leaf springs positioned within an interior of the storage slot, the interior formed by four rectilinearly oriented side walls having an opening at one end. The two bowed leaf springs are arranged at substantially right angles to each other at two the side walls and opposite from, respectively, two opposite side walls, the bowed leaf springs extending in a direction parallel to a direction of insertion and withdrawal of a data storage cartridge through the opening. Each bowed leaf spring is fixed at the end closest to the opening, and is supported for compression toward a data storage cartridge. A bowed portion of each of the bowed leaf springs forms a ramp surface towards the opening and towards a corresponding opposite side wall. The bowed leaf springs are located a distance from the corresponding opposite side wall such that the bowed leaf spring when in a relaxed state comprises an interference fit at the bowed portion of the bowed leaf spring with the smallest dimensioned data storage cartridge at respectfully the width and thickness dimensions of the data storage cartridge.

In another embodiment, a storage slot comprises a plurality of side walls forming an interior, and forming an opening at one end of the side walls, the opening having dimensions greater than the greatest width dimension and greater than the greatest thickness dimension of the data storage cartridges, for accommodating insertion and withdrawal of a data storage cartridge through the opening. At least two bowed leaf springs are positioned within the interior with respect to the opening and arranged at substantially right angles to each other and opposite from, respectively, two of the side walls, the bowed leaf springs extending in a direction parallel to a direction of insertion and withdrawal of a data storage cartridge through the opening. The bowed leaf springs are fixed at the end closest to the opening, and a bowed portion of each of the bowed leaf springs forms a ramp surface towards the opening and towards the opposite side wall. The bowed leaf springs are located a distance from the opposite side wall such that the bowed leaf spring when in a relaxed state comprises an interference fit at the bowed portion of the bowed leaf spring with the smallest dimensioned data storage cartridge at respectfully the width and thickness dimensions of the data storage cartridge. At least one of the opposite side walls forms an alignment surface at a location in the interior opposite at least one corresponding bowed leaf spring and substantially parallel to the direction of the corresponding at least one bowed leaf spring, for aligning the data storage cartridge when the data storage cartridge is positioned thereagainst by compression of the oppositely positioned bowed leaf spring.

In a further embodiment, at least one side wall alignment surface is along the width dimension of a data storage cartridge.

In another embodiment, a support slidably engages each bowed leaf spring at the end thereof furthest from the opening, the slidably engaged end opposite the fixed end.

In a further embodiment, each support comprises a compression surface positioned to support the slidably engaged end of a corresponding bowed leaf spring at the side of the bowed leaf spring opposite from the data storage cartridge, to support the bowed leaf spring for compression.

In another embodiment, each support comprises a retainer fixed within the interior and oriented transverse to a corresponding slidably engaged bowed leaf spring and oriented to slidably engage the surface of the corresponding slidably engaged bowed leaf spring toward the data storage cartridge.

In a further embodiment, the fixed end of each bowed leaf spring is wrapped at least partially around a second retainer that is fixed within the interior and oriented transverse to the bowed leaf spring.

In a further embodiment, the retainer comprises a rod positioned at, and fixed within the interior.

In another embodiment, the retainer comprises a protrusion from the interior.

In another embodiment, the fixed end of each bowed leaf spring is cemented to a surface of a corresponding said side wall.

In another embodiment, each bowed leaf spring is cantilevered from the fixed end thereof.

In another embodiment, a plurality of storage slots are within a data storage library having a plurality of data storage drives, each of a type to handle a data storage cartridge of at least one set of differing dimensions; and a robot accessor arranged to insert and withdraw data storage cartridges with respect to the storage slots, and to supply data storage cartridges to and from the data storage drives.

For a fuller understanding of the present invention, reference should be made to the following detailed description taken in conjunction with the accompanying drawings.

DETAILED DESCRIPTION OF THE INVENTION

Figure 1:
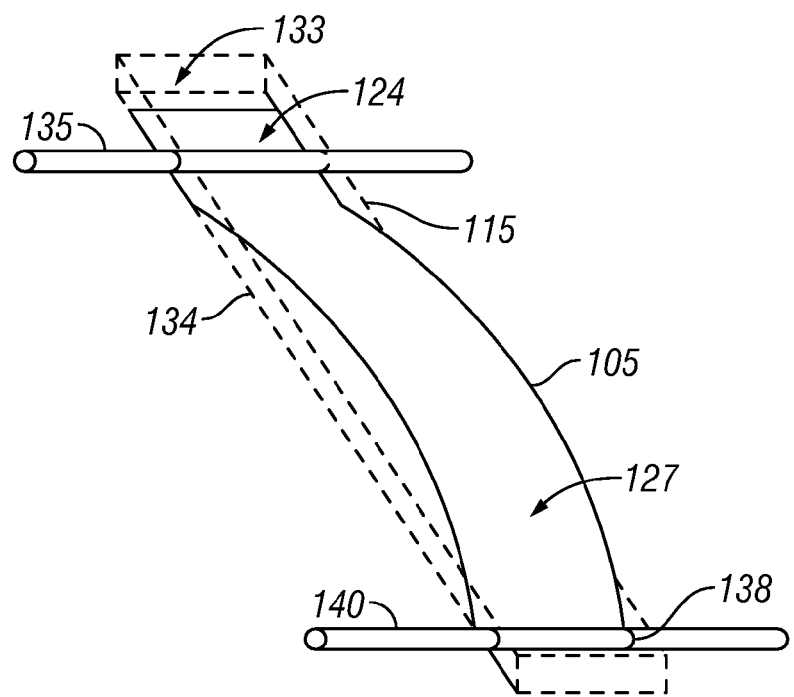
FIG. 1 is a perspective view of a bowed leaf spring and support retainers in accordance with an embodiment of a storage slot of the present invention.

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Referring to FIGS. 1, 2, 3, 4 and 5, a storage slot 100 is illustrated having multiple bowed leaf springs 103 and 105 for removably holding and aligning data storage cartridges, such as data storage cartridges 110 and 112, of differing dimensions. In the example, data storage cartridge 110 is an IBM® LTO tape cartridge, and data storage cartridge 112 is an IBM® 3592 Jx-type tape cartridge. The IBM® 3592 Jx-type tape cartridge 112 is slightly larger than an IBM® LTO tape cartridge 110. The differences in size together with mechanical differences differentiates the two cartridges and prevents the IBM® 3592 Jx-type tape cartridge from being loaded into an IBM® LTO tape drive.

The storage slot 100 is arranged to hold and align either of the tape cartridges. Two bowed leaf springs 103 and 105 are positioned within the storage slot 100, at two side walls 113 and 115, which herein may be called engagement walls, and opposite from, respectively, two opposite side walls 117 and 119. The bowed leaf springs 103 and 105 extend in a direction parallel to a direction 120 of insertion and withdrawal of a data storage cartridge. The bowed leaf springs are fixed at the end 122 closest to the opening 123 in the storage slot, and slidably engage the sidewall at the end 124 furthest from the opening. A bowed portion 126 of each bowed leaf spring forms a ramp surface 127 towards the opening 123 and towards a corresponding opposite side wall 119.

The bowed leaf springs, e.g. leaf spring 105, are located a distance 130 from an alignment surface 129 of the corresponding opposite side wall 119 to form an interference fit with the smallest dimensioned data storage. The bowed leaf springs thus are supported at the engagement walls to provide compression toward an inserted data storage cartridge, to hold and align the data storage cartridge against the opposite side wall alignment surface 129.

Figure 2:
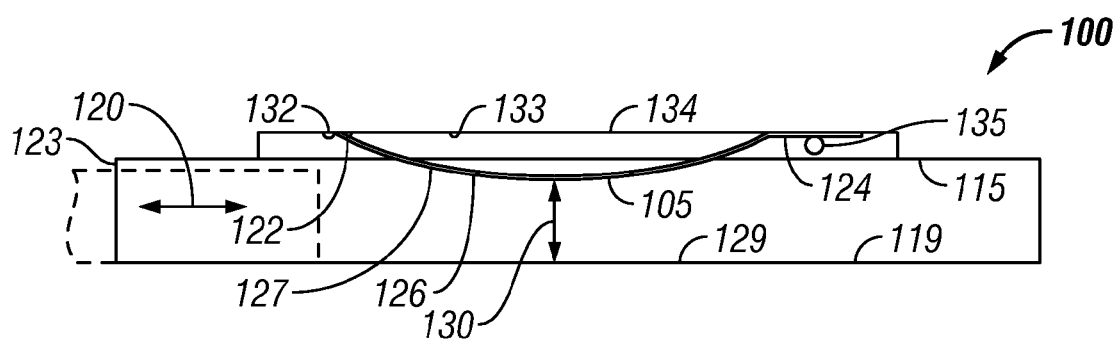
FIG. 2 is a side view of the interior of a storage slot and a bowed leaf spring in accordance with an alternative embodiment of the present invention.
Figure 3:
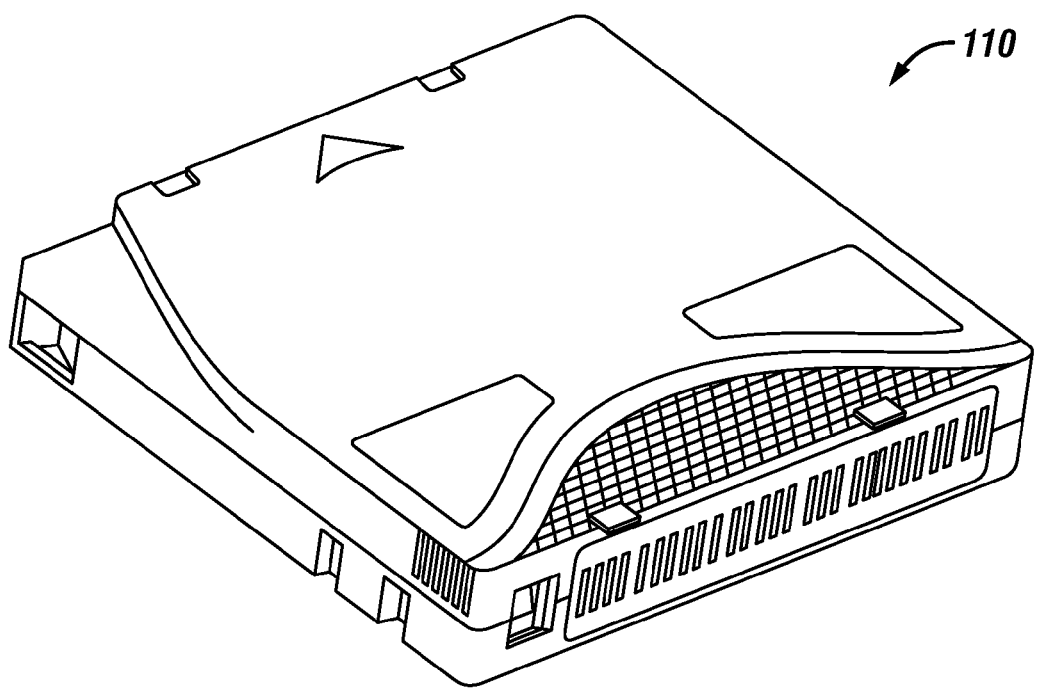
FIGS. 3 and 4 are perspective views of examples of data storage cartridges of differing dimensions.
Figure 4:
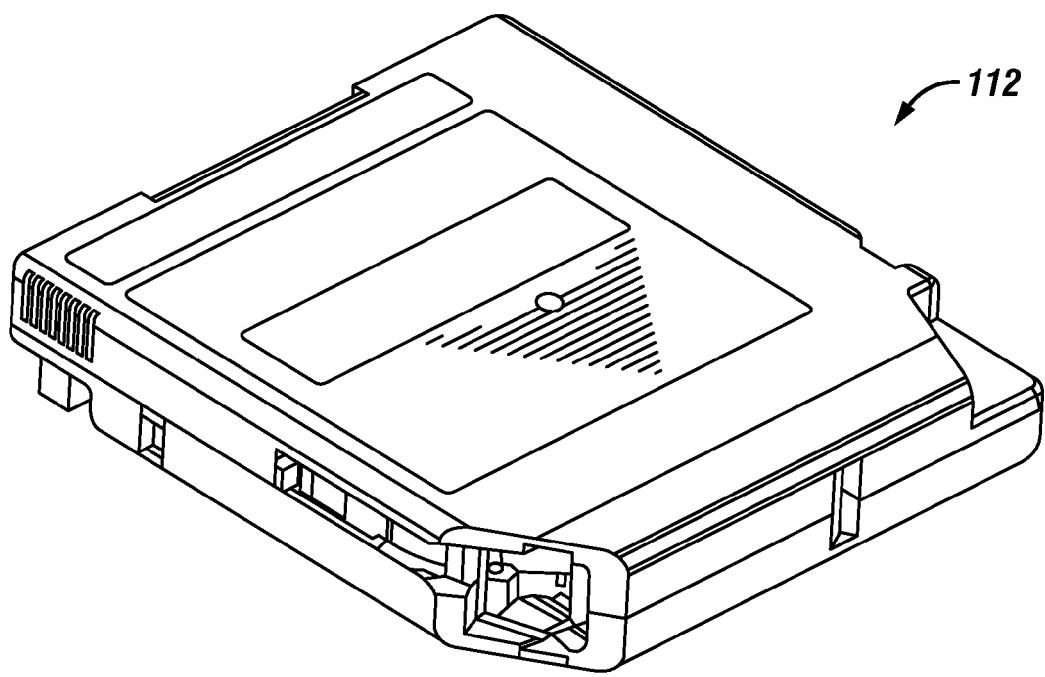

Referring to FIGS. 1 and 2, the end 124 of the bowed leaf spring 105 is supported by a compression surface 133 of a support 134, the compression surface positioned to support the slidably engaged end 124 of the corresponding bowed leaf spring at the side of the bowed leaf spring opposite from the data storage cartridge, to thereby support the bowed leaf spring for compression.

Still referring to FIGS. 1 and 2, the support 134 comprises a retainer 135 fixed within the interior and oriented transverse to the corresponding slidably engaged bowed leaf spring and oriented to slidably engage the surface of the end 124 of the corresponding slidably engaged bowed leaf spring that is facing toward the data storage cartridge. The retainer 135 holds the bowed leaf spring in position when the cartridge is withdrawn from the storage slot. In one embodiment, the bowed leaf spring 105 is loosely engaged between the retainer 135 and the compression surface 133 of the support 134, and held in position while the cartridge is withdrawn from the storage slot. Thus, the bowed leaf spring is slidably engaged by the rod and compression surface as the data storage cartridge is being inserted or being withdrawn with respect to the data storage slot; and the bowed leaf spring is supported for compression by the compression surface when the cartridge is inserted into the data storage slot.

In one embodiment as illustrated in FIGS. 1 and 2, the retainer 135 comprises a rod positioned at and fixed within the interior. The rod may be of a material, such as metal, inserted into the support wall, or may comprise a part of the support 134, such as being molded with the support wall.

In one embodiment as illustrated in FIG. 1, the fixed end 138 of the bowed leaf spring is wrapped at least partially around a second rod 140 of the support 134 that is fixed within the storage slot interior and oriented transverse to the bowed leaf spring. The rod 140 thus supports the fixed end 138 of the bowed leaf spring for compression when a data storage cartridge is inserted into the data storage slot. Further, the second rod 140 holds the bowed leaf spring 105 in position in the direction parallel to the direction of insertion and withdrawal of a data storage cartridge through the opening while the cartridge is being inserted or being withdrawn with respect to the data storage slot. In one example, the bowed leaf spring is fixed or held in position at the end 138 so that it holds its position when the data storage cartridge is inserted into the storage slot and engages the ramp 127. At the other end 124, the bowed leaf spring is slidably engaged with rod 135 and compression surface 133 to allow movement of the end in the direction parallel to the direction of insertion and withdrawal of a data storage cartridge as the leaf spring is compressed by insertion of a data storage cartridge and released by the withdrawal of a cartridge.

Figure 5:
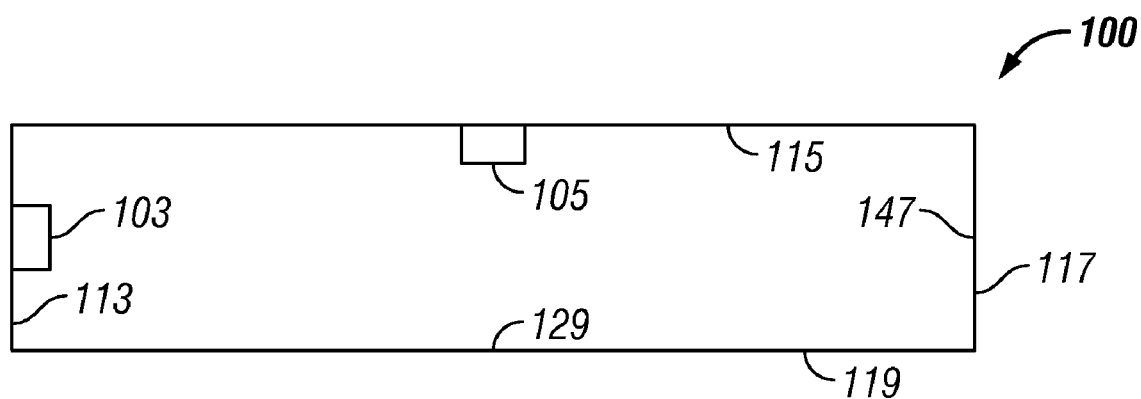
FIG. 5 is a front view of a storage slot in accordance with the present invention.

Referring to FIGS. 1, 2 and 5, the support surface 133 comprises a groove in the side wall 115 so that the retainer rods 135 and 140 are secured in the side wall 115.

In the embodiment of FIG. 2, the fixed end 122 of the bowed leaf spring 105 is supported by being cemented 132 to the surface 133 of the support 134 of a corresponding side wall 115. The cement 132 thus supports the fixed end 138 of the bowed leaf spring for compression when a data storage cartridge is inserted into the data storage slot. Further, the cement 132 holds the bowed leaf spring 105 in position in the direction parallel to the direction of insertion and withdrawal of a data storage cartridge through the opening 123 while the cartridge is being inserted or being withdrawn with respect to the data storage slot. As discussed above, in one example, the bowed leaf spring is fixed or held in position at the end 138 so that it holds its position when the data storage cartridge is inserted into the storage slot and engages the ramp 127. At the other end 124, the bowed leaf spring is slidably engaged with rod 135 and compression surface 133 to allow movement of the end in the direction parallel to the direction of insertion and withdrawal of a data storage cartridge as the leaf spring is compressed by insertion of a data storage cartridge and released by the withdrawal of a cartridge.

Referring to FIGS. 2 and 5, a storage slot comprises a plurality of side walls 113, 115, 117 and 119 forming an interior, and forming an opening 123 at one end of the side walls. In one example, the side walls comprise four rectilinearly oriented side walls having an opening at one end. The opening 123 has dimensions greater than the greatest width dimension and greater than the greatest thickness dimension of the data storage cartridges, for accommodating insertion and withdrawal of a data storage cartridge through the opening.

In the embodiment of FIG. 5, one bowed leaf spring 105 provides the compression force to the data storage cartridge to position the data storage cartridge against the alignment surface 129 of the opposite side wall 119 at a location in the interior opposite the leaf spring. In one embodiment, the alignment surface 129 provides the alignment of the data storage cartridge along the width dimension of the data storage cartridge. Another bowed leaf spring 103 provides the compression force to position the data storage cartridge against the opposite side wall 117. In an alternative embodiment, surface 147 of side wall 117 also comprises an alignment surface, and provides the alignment of the data storage cartridge along the thickness dimension of the data storage cartridge, as well as positioning the data storage cartridge.

Figure 6:
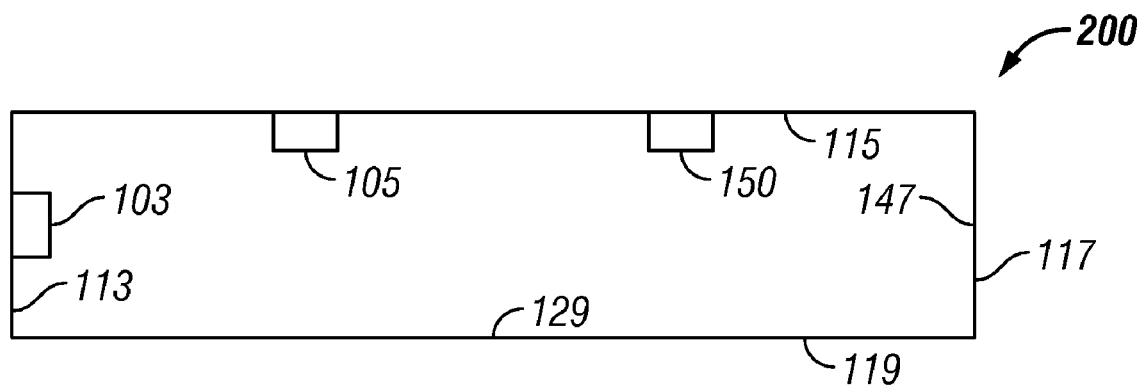
FIG. 6 is a front view of an alternative embodiment of a storage slot in accordance with the present invention.
Figure 7:
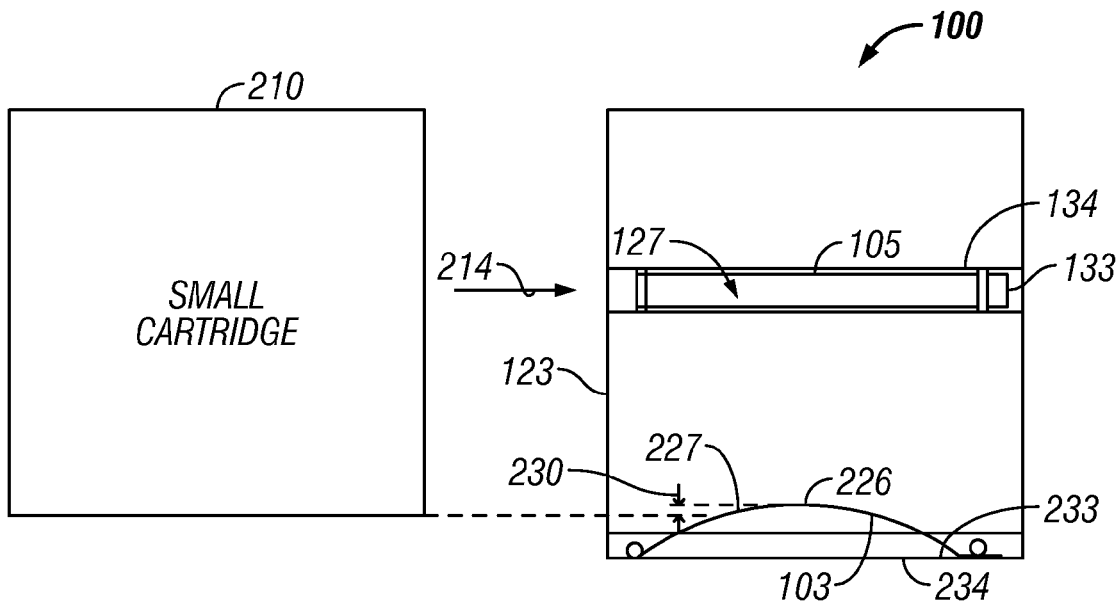
FIGS. 7 and 8 are bottom views of the interior of a storage slot in accordance with the present invention and of, respectively, a cartridge of small dimensions, and a cartridge of large dimensions, the cartridges external of the storage slot.
Figure 8:
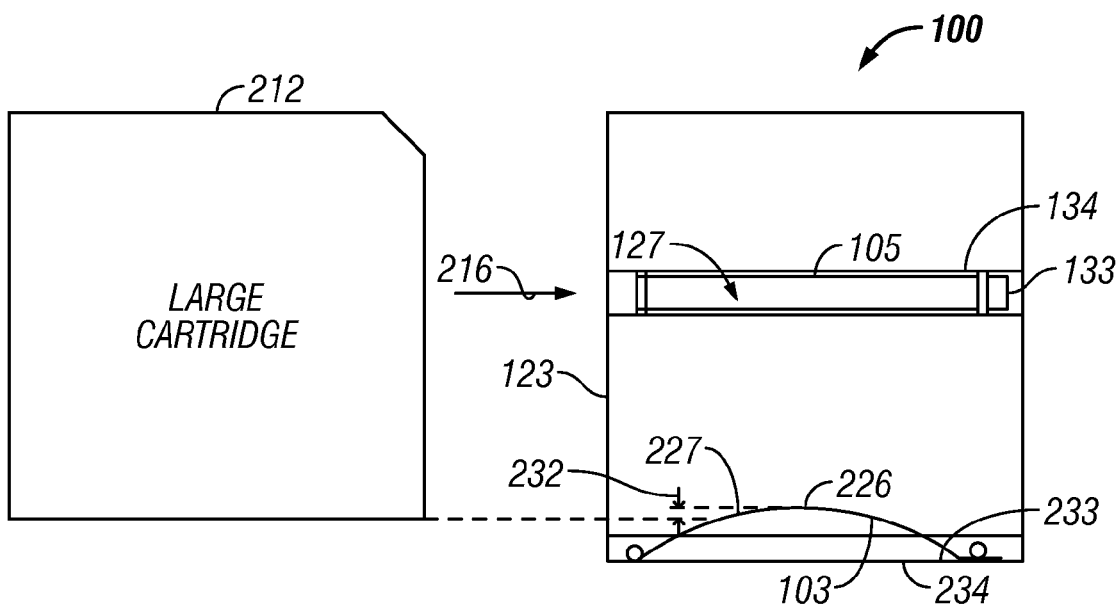
Figure 9:
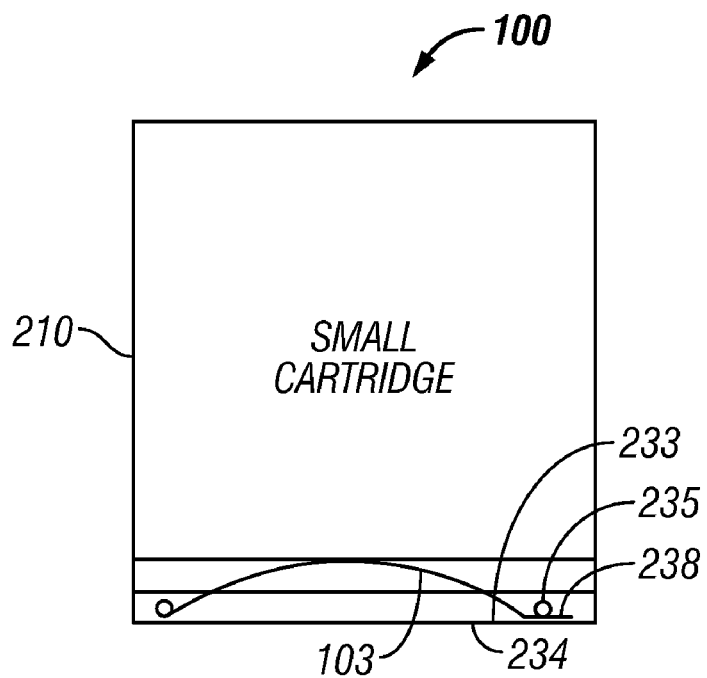
FIGS. 9 and 10 are bottom views of the interior of a storage slot in accordance with the present invention and of, respectively, a cartridge of small dimensions, and a cartridge of large dimensions, the cartridges positioned within the storage slot.
Figure 10:
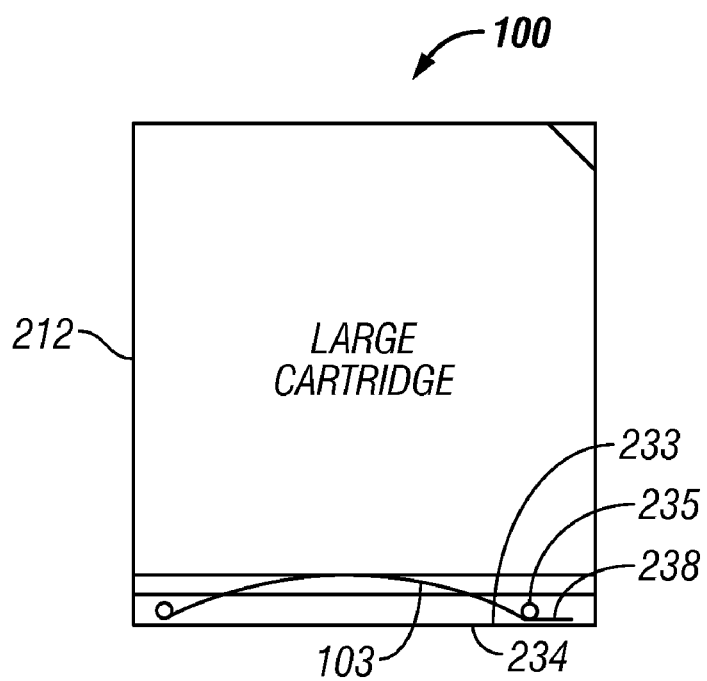

In the embodiment of FIG. 6, a storage slot 200 is illustrated having two bowed leaf springs 105 and 150 at the top side wall 115. The two bowed leaf springs 105 and 150 have similar spring constants and provide substantially equal compression force to the data storage cartridge to position the data storage cartridge against the alignment surface 129 of the opposite side wall 119. In one embodiment, the alignment surface 129 provides the alignment of the data storage cartridge along the width dimension of the data storage cartridge. As with respect to the above discussed embodiment, another bowed leaf spring 103 at side wall 113 provides the compression force to position the data storage cartridge against the opposite side wall 117. In an alternative embodiment, surface 147 of side wall 117 also comprises an alignment surface, and provides the alignment of the data storage cartridge along the thickness dimension of the data storage cartridge, as well as positioning the data storage cartridge.

Referring to FIGS. 7, 8, 9 and 10, an embodiment of the storage slot 100 is illustrated into which a small data storage cartridge 210 or a large data storage cartridge 212 is inserted. Two bowed leaf springs 103 and 105 are positioned at substantially right angles to each other and extending in a direction parallel to a direction 214, 216 of insertion and withdrawal of a data storage cartridge through the opening. The bowed leaf springs 103, 105 are fixed at the end closest to the opening 123 of the storage slot. A bowed portion of each of the bowed leaf springs forms a ramp surface 127, 227 towards the opening 123 and towards the opposite side wall. The bowed leaf springs are located a distance from the opposite side wall such that the bowed leaf spring when in a relaxed state comprises an interference fit 230 at the bowed portion of the bowed leaf spring with the smallest dimensioned data storage cartridge 210 at respectfully the width and thickness dimensions of the data storage cartridge. This results in a greater interference fit 232 with respect to the larger dimensioned data storage cartridge 212.

A compression surface 133, 233 of support 134, 234 slidably engages each bowed leaf spring 103, 105 at the end thereof furthest from the opening, the slidably engaged end opposite the fixed end.

When the data storage cartridge 210, 212 is inserted into the storage slot, the bowed leaf spring 103, 105 is compressed. Spring 105 is hidden from view in the illustration of FIGS. 9 and 10 when the cartridge is fully inserted, but the spring functions similarly to illustrated bowed leaf spring 103. When the bowed leaf spring is compressed, it flattens out to some extent, moving end 238 toward the rear of the storage slot and away from the opening 123. The slidable engagement of the bowed leaf spring by retainer 235 and surface 233 allows this motion to occur. The compression surface 233 is positioned to support the slidably engaged end of the corresponding bowed leaf spring for compression against the data storage cartridge.

The shape of the bow 226 and the resilience of the bowed leaf springs are configured to provide compression sufficient to hold and align the smallest expected data storage cartridge and to not deform with respect to the largest expected cartridge. Thus, the bowed leaf springs hold and may align the data storage cartridge against the respective opposite side wall.

Figure 11:
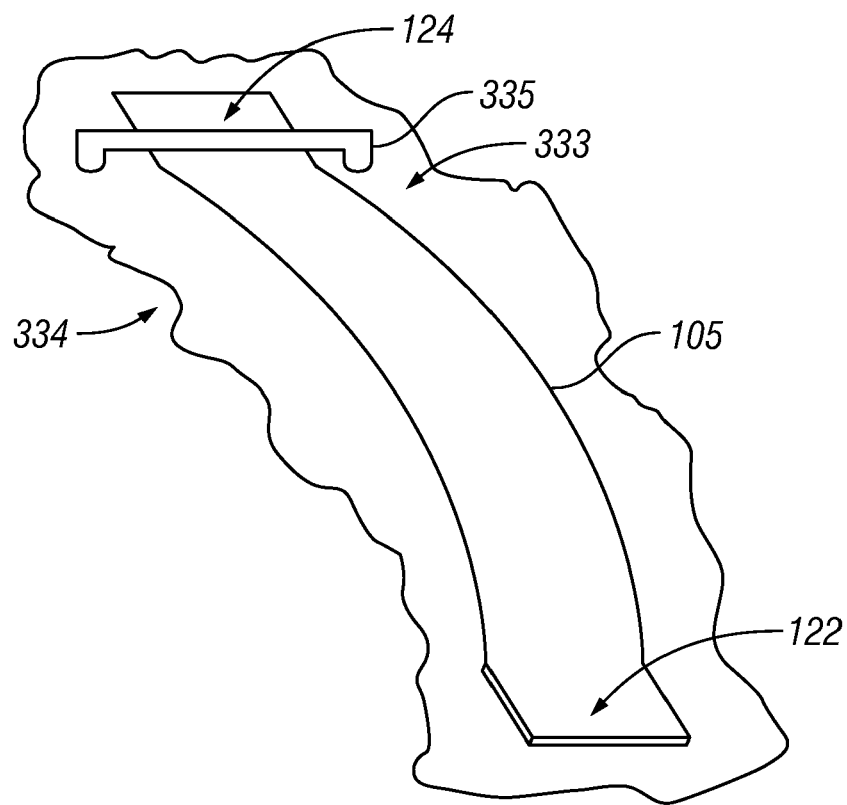
FIG. 11 is a perspective view of an alternative embodiment of a bowed leaf spring and support retainer in accordance with an embodiment of a storage slot of the present invention.

Referring to FIG. 11, end 124 of bowed leaf spring 105 is slidably engaged by retainer 335 which comprises a protrusion from a surface 333 of the support 334 of the interior. The protrusion may, for example, comprise a part of the support 334, such as being molded with the support. The fixed end 122 of the bowed leaf spring is shown cemented to the surface 333 of the support 334.

Figure 12:
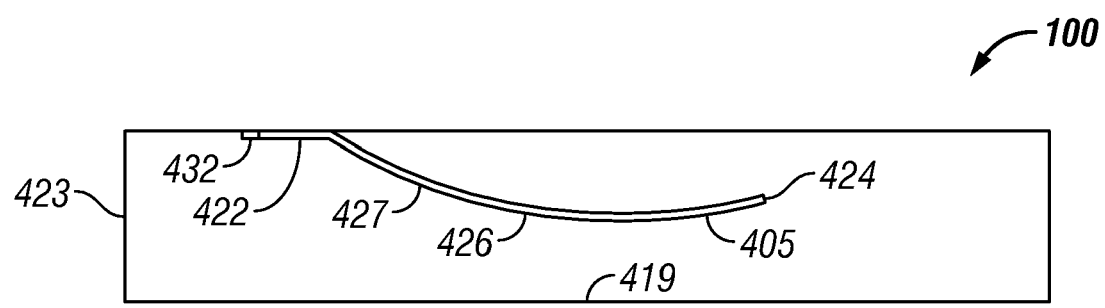
FIG. 12 is a side view of an alternative embodiment of a bowed leaf spring in accordance with an embodiment of a storage slot of the present invention.

Referring to FIG. 12, an alternative embodiment of a bowed leaf spring 405 is cantilevered from end 422 which is fixed to side wall 413, for example, by being cemented 432 to the side wall. A bowed portion 426 of the bowed leaf spring forms a ramp surface 427 towards opening 423 of storage slot 100 and towards a corresponding opposite side wall 419.

The cantilevered arrangement of bowed leaf spring 405 eliminates the need for a retainer at the end 424 furthest from the opening 423, and eliminates the need for a compression surface at end 424. Instead, the compression force to provide compression toward an inserted data storage cartridge is provided by the cantilever 432 of end 422.

Figure 13:
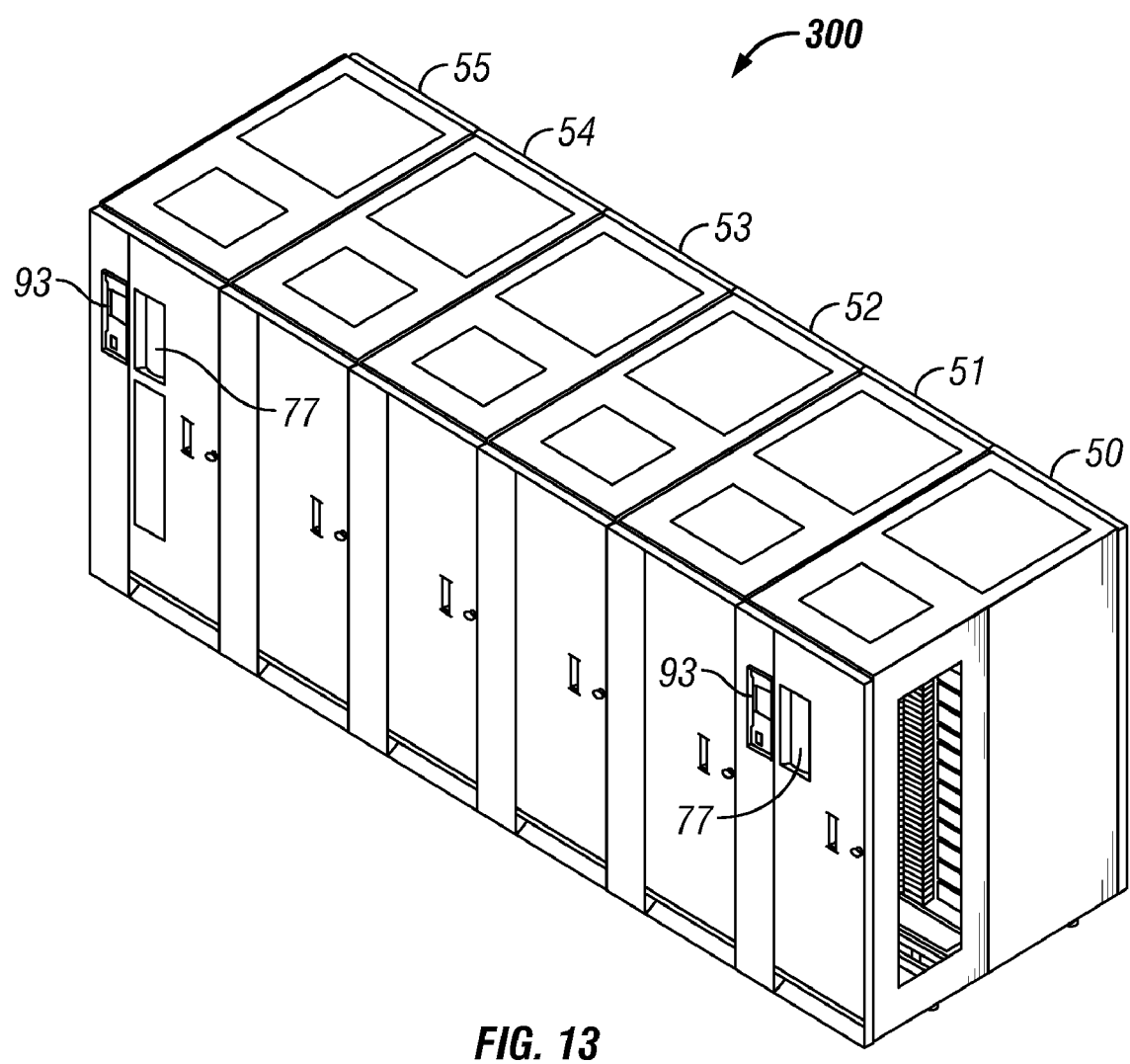
FIG. 13 is a perspective view of an automated data storage library that incorporates storage slots in accordance with the present invention.
Figure 14:
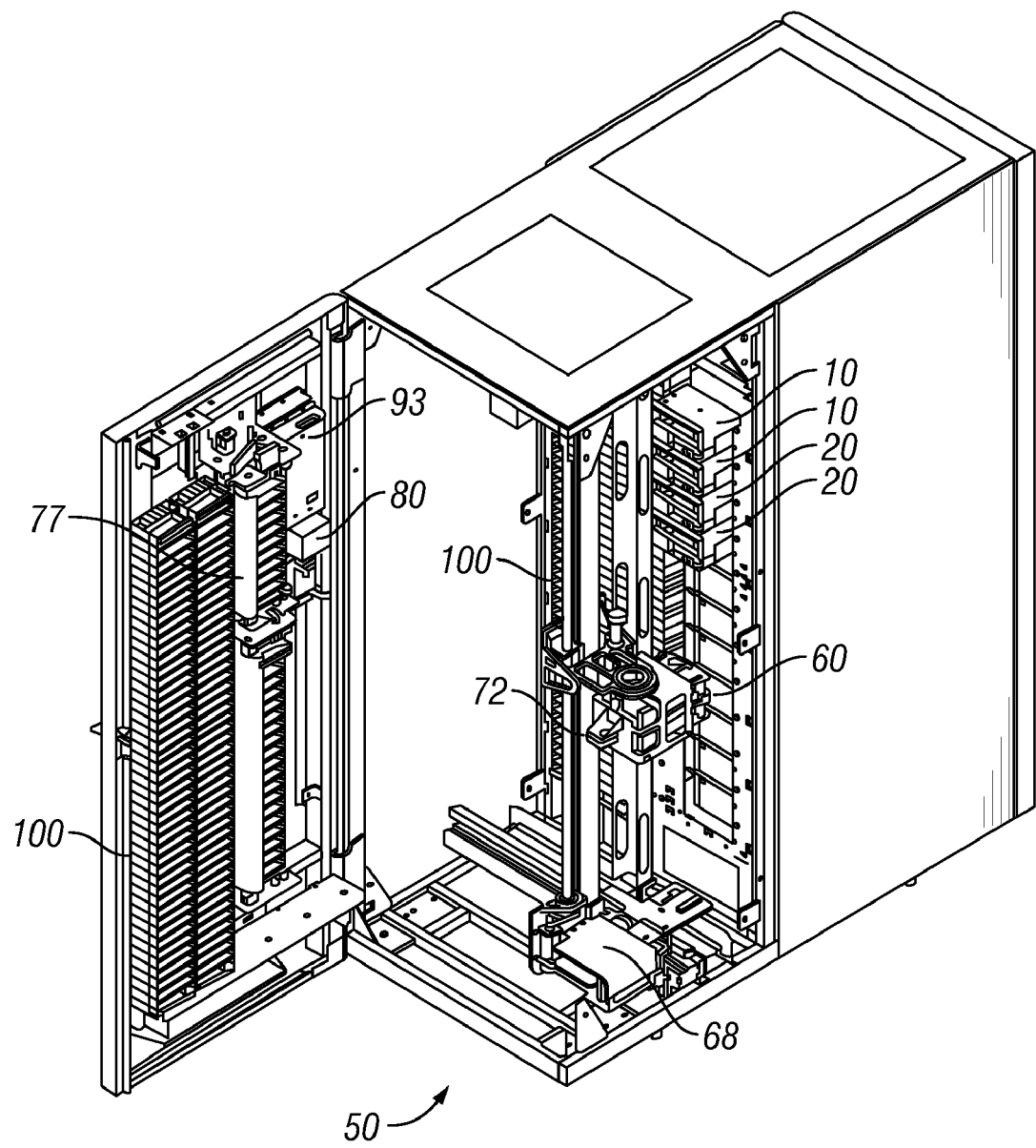
FIG. 14 is a perspective view of a frame of the automated data storage library of FIG. 13.

FIGS. 13 and 14 illustrate an embodiment of an automated data storage library 300 configured to access data storage cartridges, such as magnetic tape cartridges. The automated data storage library comprises one or more frames 50, 51, 52, 53, 54, and 55, each of which has a plurality of storage slots 100 for storing the data storage cartridges of differing dimensions. A plurality of data storage drives 10 are configured for reading and for writing data with respect to the data storage media of one of the types of data storage cartridges, and another plurality of data storage drives 20 are configured for reading and for writing data with respect to the data storage media of another of the types of data storage cartridges. The library 300 further comprises at least one robot accessor 68 arranged to transport data storage cartridges between a plurality of data storage drives 10, 20 and a plurality of storage slots 100, to insert and withdraw data storage cartridges with respect to the storage slots, and to supply data storage cartridges to and from the data storage drives 10, 20. The robot accessor 68 comprises a gripper assembly 60 for gripping one or more of the data storage cartridges, and may comprise an accessor sensor 72 to read the labels of the data storage cartridges. Data storage cartridges may be added to or removed from the library, for example, at input/output stations 77.

The library 300 also comprises a library control 80, which alternatively may be distributed among the frames, to operate the library, communicate with a host system, and communicate with the data storage drives 10 and 20. Further, the library may provide one or more operator panels 93 for communicating with the library control. An example of an automated data storage library comprises the IBM® 3584 tape library, and another example of an automated data storage library comprises the IBM® 3494 tape library. Herein "library control" may comprise any suitable logic, microprocessor, and associated memory and/or data storage for responding to program code, and the associated memory and/or data storage may comprise fixed or rewritable memory or data storage devices. The program code may be supplied to the library control directly as from a data storage device or memory, for example by an input from an optical disk, for example at operator panel 93, or from a network, or by any other suitable means.

The storage slots 100 allow various types of data storage cartridges having differing dimensions to be stored in the automated data storage library. The plurality of data storage drives 10 and 20, each of a type to handle a data storage cartridge of at least one set of said differing dimensions, provide the capability to read and write data to the various types of data storage cartridges. In one example, the various types of data storage cartridges may contain similar media, such as half-inch magnetic tape, or alternatively may contain dissimilar media, such as magnetic tape in one type of data storage cartridge, and one or more optical disks in another type of data storage cartridge.

Those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A storage slot for removably holding and aligning data storage cartridges of differing dimensions comprising:
    a plurality of side walls forming an interior, and forming an opening at one end of said side walls, said opening having dimensions greater than the greatest width dimension and greater than the greatest thickness dimension of said data storage cartridges, for accommodating insertion and withdrawal of a data storage cartridge through said opening;
    at least two bowed leaf springs positioned within said interior with respect to said opening arranged at substantially right angles to each other and opposite from, respectively, two of said side walls, said bowed leaf springs extending in a direction parallel to a direction of insertion and withdrawal of a data storage cartridge through said opening, said bowed leaf springs fixed at the end closest to said opening, a bowed portion of each of said bowed leaf springs forming a ramp surface towards said opening and towards said opposite side wall; said at least two bowed leaf springs located a distance from said opposite side wall such that said bowed leaf spring when in a relaxed state comprises an interference fit at the bowed portion of said bowed leaf spring with the smallest dimensioned said data storage cartridge at respectfully the width and thickness dimensions of said data storage cartridge;
    at least one of said opposite side walls forming an alignment surface at a location in said interior opposite at least one corresponding said bowed leaf spring and substantially parallel to the direction of said corresponding at least one bowed leaf spring, for aligning said data storage cartridge when said data storage cartridge is positioned thereagainst by compression of said oppositely positioned bowed leaf spring; and
    comprising a support slidably engaging each said bowed leaf spring at the end thereof furthest from said opening, said slidably engaged end opposite said fixed end.

2. The storage slot of claim 1, wherein each said support comprises a compression surface positioned to support said slidably engaged end of a corresponding said bowed leaf spring at the side of said bowed leaf spring opposite from said data storage cartridge, to support said bowed leaf spring for compression.

3. The storage slot of claim 2, wherein each said support comprises a retainer fixed within said interior and oriented transverse to a corresponding said slidably engaged bowed leaf spring and oriented to slidably engage the surface of said corresponding slidably engaged bowed leaf spring toward said data storage cartridge.

4. The storage slot of claim 3, wherein said fixed end of each said bowed leaf spring is wrapped at least partially around a second retainer fixed within said interior and oriented transverse to said bowed leaf spring.

5. The storage slot of claim 3, wherein said retainer comprises a rod positioned at and fixed within said interior.

6. The storage slot of claim 3, wherein said retainer comprises a protrusion from said interior.

7. A storage slot for removably holding and aligning data storage cartridges of differing dimensions comprising:
    four rectilinearly oriented side walls forming an interior, and forming an opening at one end of said side walls, said opening having dimensions greater than the greatest width dimension and greater than the greatest thickness dimension of said data storage cartridges, for accommodating insertion and withdrawal of a data storage cartridge through said opening, said side walls comprising two engagement side walls and two opposite side walls;
    at least two bowed leaf springs positioned within said interior at said two engagement side walls and with respect to said opening arranged at substantially right angles to each other and opposite from, respectively, said opposite side walls, said bowed leaf springs extending in a direction parallel to a direction of insertion and withdrawal of a data storage cartridge through said opening, said bowed leaf springs fixed at the end closest to said opening, a bowed portion of each of said bowed leaf springs forming a ramp surface towards said opening and towards a corresponding said opposite side wall; said at least two bowed leaf springs located a distance from said corresponding opposite side wall such that said bowed leaf spring when in a relaxed state comprises an interference fit at the bowed portion of said bowed leaf spring with the smallest dimensioned said data storage cartridge at respectfully the width and thickness dimensions of said data storage cartridge; and
    at least one of said two opposite side walls forming an alignment surface at a location in said interior opposite at least one corresponding said bowed leaf spring and substantially parallel to the direction of said corresponding at least one bowed leaf spring, for aligning said data storage cartridge when said data storage cartridge is positioned thereagainst by compression of said oppositely positioned bowed leaf spring; wherein at least one said side wall alignment surface is along the width dimension of a data storage cartridge; and said two engagement side walls each comprising at least one support slidably engaging each said bowed leaf spring at the end thereof furthest from said opening, said slidably engaged end opposite said fixed end; wherein each said support comprises a compression surface positioned to support said slidably engaged end of a corresponding said bowed leaf spring at the side of said bowed leaf spring opposite from said data storage cartridge, to support said bowed leaf spring for compression; and wherein each said support comprises a retainer fixed within said interior and oriented transverse to a corresponding said slidably engaged bowed leaf spring and oriented to slidably engage the surface of said corresponding slidably engaged bowed leaf spring toward said data storage cartridge.

8. A data storage library for inserting and withdrawing data storage cartridges of differing dimensions from storage slots and supplying said data storage cartridges to and from data storage drives; comprising:

a plurality of data storage drives, each of a type to handle a data storage cartridge of at least one set of said differing dimensions;

a robot accessor arranged to transport data storage cartridges between a plurality of said data storage drives and a plurality of said storage slots, to insert and withdraw data storage cartridges with respect to said storage slots, and to supply data storage cartridges to and from a plurality of said data storage drives; and a plurality of storage slots for removably holding data storage cartridges of differing dimensions comprising:

a plurality of side walls forming an interior, and forming an opening at one end of said side walls, said opening having dimensions greater than the greatest width dimension and greater than the greatest thickness dimension of said data storage cartridges, for accommodating insertion and withdrawal of a data storage cartridge through said opening;

at least two bowed leaf springs positioned within said interior with respect to said opening arranged at substantially right angles to each other and opposite from, respectively, two of said side walls, said bowed leaf springs extending in a direction parallel to a direction of insertion and withdrawal of a data storage cartridge through said opening, said bowed leaf springs fixed at the end closest to said opening, a bowed portion of each of said bowed leaf springs forming a ramp surface towards said opening and towards said opposite side wall; said at least two bowed leaf springs located a distance from said opposite side wall such that said bowed leaf spring when in a relaxed state comprises an interference fit at the bowed portion of said bowed leaf spring with the smallest dimensioned said data storage cartridge at respectfully the width and thickness dimensions of said data storage cartridge; and at least one of said opposite side walls forming an alignment surface at a location in said interior opposite at least one corresponding said bowed leaf spring and substantially parallel to the direction of said corresponding at least one bowed leaf spring, for aligning said data storage cartridge when said data storage cartridge is positioned thereagainst by compression of said oppositely positioned bowed leaf spring.

9. The data storage library of claim 8, wherein at least one said side wall alignment surface of said storage slots is along the width dimension of a data storage cartridge.

10. The data storage library of claim 8, comprising a storage slot support slidably engaging each said bowed leaf spring at the end thereof furthest from said opening, said slidably engaged end opposite said fixed end.

11. The data storage library of claim 10, wherein each said storage slot support comprises a compression surface positioned to support said slidably engaged end of a corresponding said bowed leaf spring at the side of said bowed leaf spring opposite from said data storage cartridge, to support said bowed leaf spring for compression.

12. The data storage library of claim 11, wherein each said storage slot support comprises a retainer fixed within said interior and oriented transverse to a corresponding said slidably engaged bowed leaf spring and oriented to slidably engage the surface of said corresponding slidably engaged bowed leaf spring toward said data storage cartridge.

13. The data storage library of claim 11, wherein said fixed end of each said bowed leaf spring is wrapped at least partially around a second retainer fixed within said interior and oriented transverse to said bowed leaf spring.

14. The data storage library of claim 8, wherein said bowed leaf spring is cantilevered from said fixed end thereof.

15. The data storage library of claim 8, wherein said fixed end of each said bowed leaf spring is cemented to a surface of a corresponding said side wall.

\* \* \* \* \*